Figure 1:
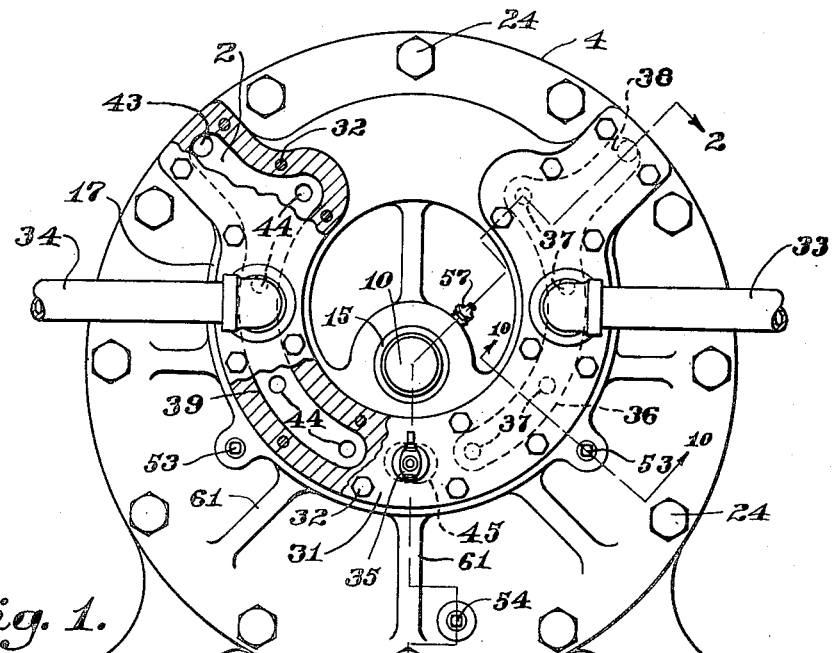

April 3, 1951  B. A. CARIDEO  2,547,374
ROTARY ENGINE

Filed Dec. 6, 1946  4 Sheets-Sheet 1

INVENTOR.
Biagio A. Carideo
BY
ATTORNEY

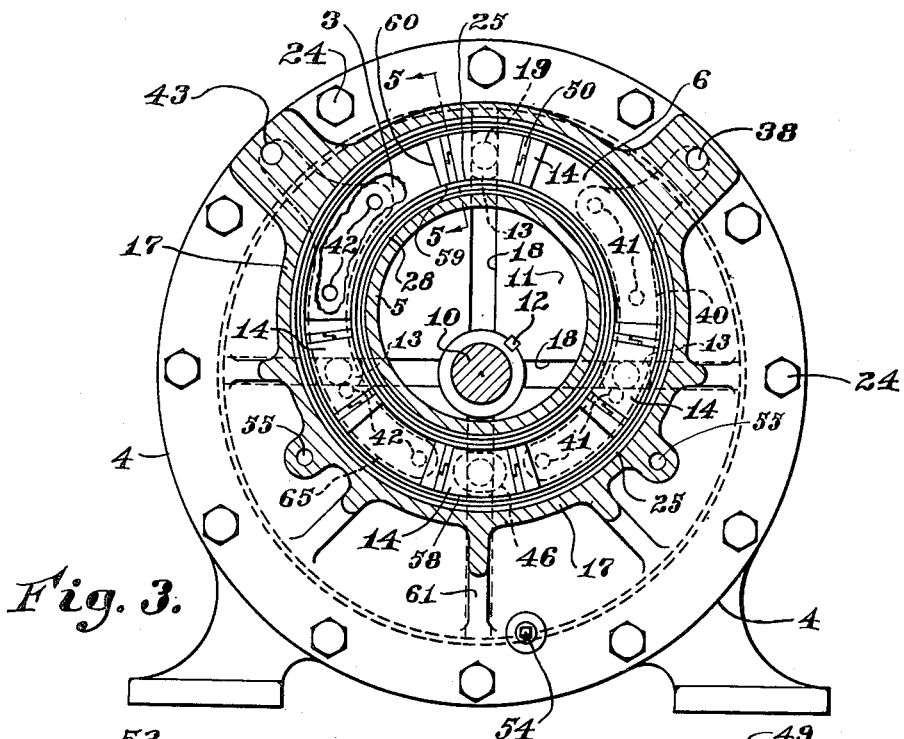

April 3, 1951     B. A. CARIDEO     2,547,374
ROTARY ENGINE
Filed Dec. 6, 1946     4 Sheets-Sheet 3
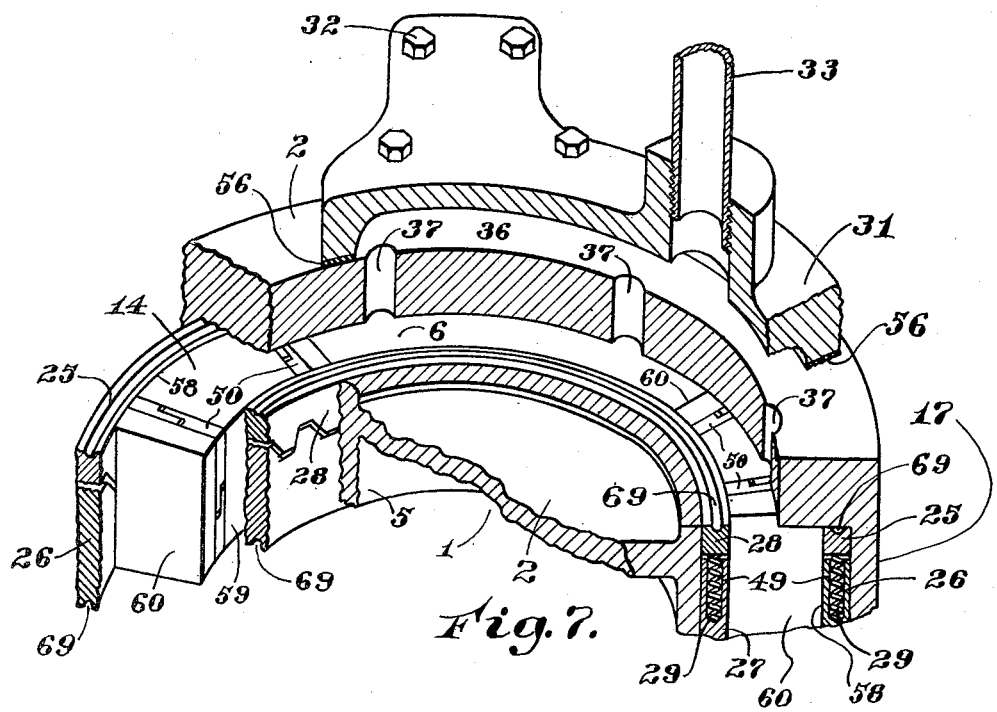
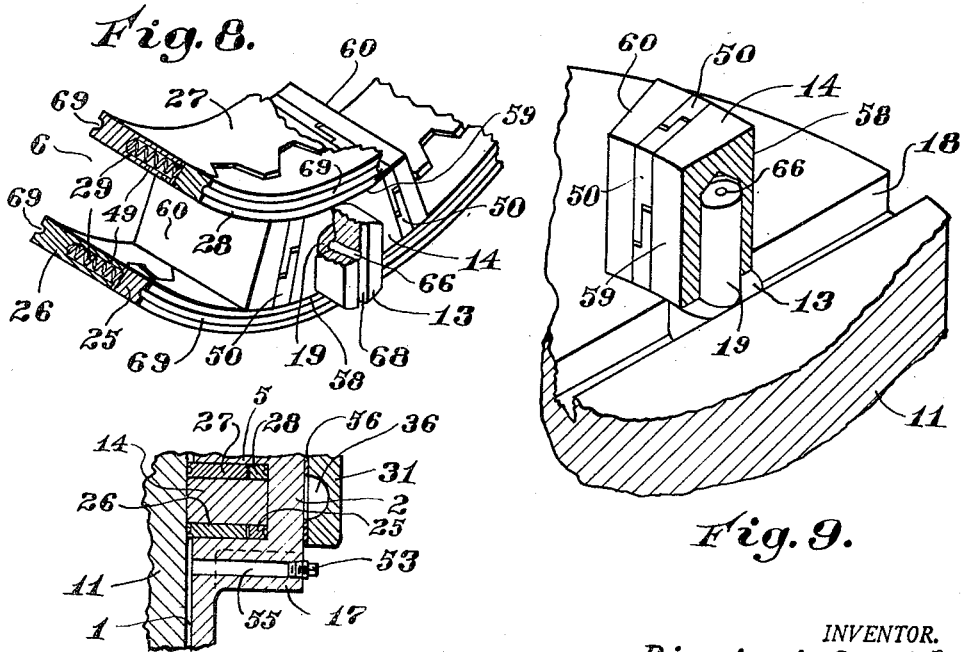
INVENTOR.
Biagio A. Carideo
BY
ATTORNEY.

April 3, 1951 B. A. CARIDEO 2,547,374
ROTARY ENGINE
Filed Dec. 6, 1946 4 Sheets-Sheet 4
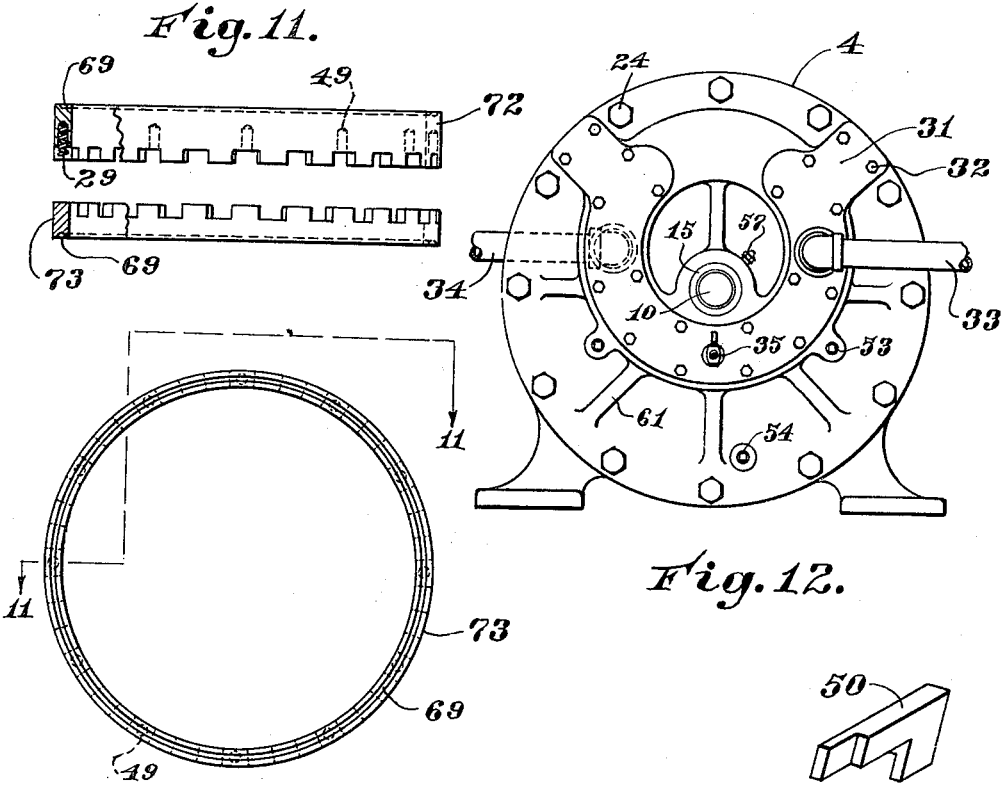
Fig. 11.
Fig. 12.
Fig. 13.
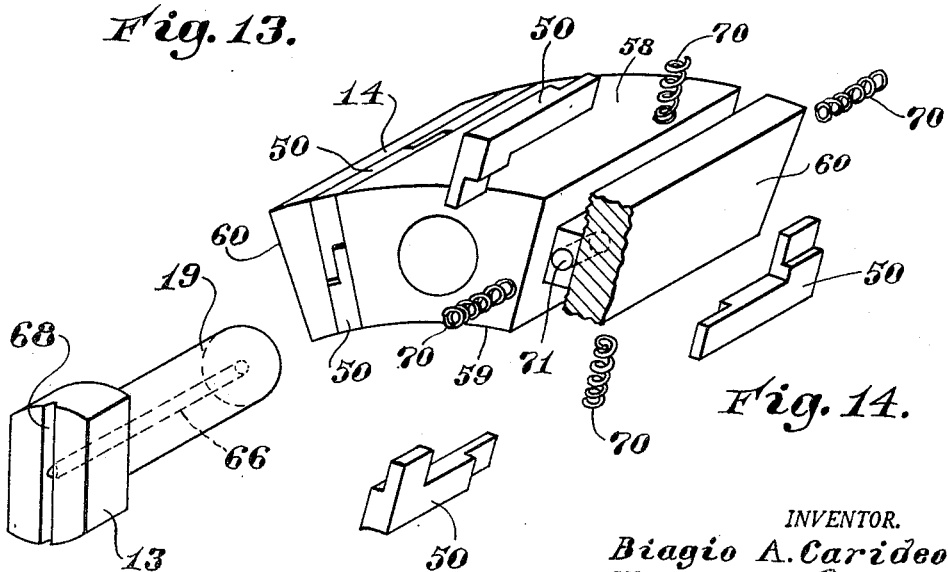
Fig. 14.
INVENTOR.
Biagio A. Carideo
BY David Rines
ATTORNEY Patented Apr. 3, 1951

2,547,374

UNITED STATES PATENT OFFICE 2,547,374

ROTARY ENGINE

Biagio A. Carideo, West Roxbury, Mass.

Application December 6, 1946, Serial No. 714,370

15 Claims. (Cl. 103—129)

The present invention relates to rotary engines, pumps, compressors and the like.

Apparatus of this type has heretofore been proposed embodying a cylindrical chamber in which a shaft-carrying disc rotates concentrically within the chamber. The proposal has involved providing the chamber with eccentrically disposed circular channels for confining the travel of correspondingly shaped arcuate pistons so connected loosely to the disc that movement of the disc and, therefore, of the shaft, is communicated to the pistons, or movement of the pistons to the disc. The space between adjacently disposed pistons and the walls of the channels were to constitute piston chambers for receiving a suitable fluid, such as steam or water.

When employed as a rotary engine for the production of power to rotate the shaft, for example, a device of this character may be driven by steam. The pistons separate in response to the expansion of the steam in the chamber or chambers, thus effecting rotation of the disc and of the power shaft carried thereby. When operated as a pump or a compressor, on the other hand, the shaft may be driven from some outside source of power to turn the disc. This effects relative movement of adjacently disposed pistons for the purpose of displacing a fluid medium, such as water, in the piston chambers between them.

One of the disadvantages of this construction has been the difficulty encountered in rendering the piston chambers leaktight.

An object of the present invention, therefore, is to provide a new and improved construction of the above-described character in which the leakage of the piston chambers shall be greatly lessened or even entirely eliminated.

Another disadvantage of prior proposed constructions has been the uneven wear of the moving parts resulting from the development of excessive varying thrusts, and another object of the invention is to provide a new and improved device of the above-described character that shall be thoroughly balanced dynamically at all times during the operation, thereby to reduce and minimize or even entirely eliminate this difficulty also.

Another object of the invention is to simplify the construction and reduce the weight of devices of the above-described character.

Other and further objects will be explained hereinafter and will be particularly pointed out in the appended claims.

To the attainment of the above ends, the present invention provides a new and improved substantially leak-tight construction unattended by excessive thrusts, direct or indirect, with the result that frictional wear on the moving parts is rendered almost negligible, and even such wear as does occur is substantially uniformly distributed.

Figure 2:
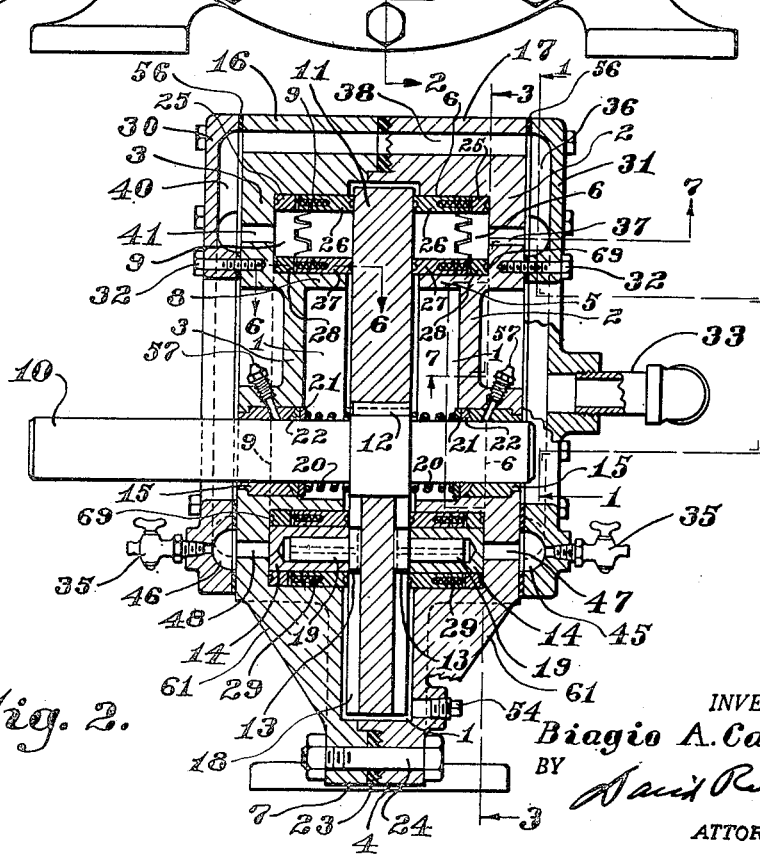

The invention will now be more fully explained in connection with the accompanying drawings, in which Fig. 1 is an elevation of a preferred rotary engine embodying the present invention, parts being shown in vertical section upon the line 1—1 of Fig. 2, looking in the direction of the arrows; Figs. 2, 3 and 4 are sections taken upon the lines 2—2 of Fig. 1, 3—3 of Fig. 2 and 4—4 of Fig. 5, respectively, looking in the directions of the respective arrows, Fig. 3 showing also a portion broken away to expose the opposite side of the casing; Fig. 5 is a view of an end wall of one of the pistons, viewed along the line 5—5 of Fig. 3, looking in the direction of the arrows, but upon a larger scale; Fig. 6 is a section taken upon the line 6—6 of Fig. 2, looking in the direction of the arrows, but upon a larger scale; Figs. 7 to 10 are similarly enlarged fragmentary sections, shown in perspective, the sections of Figs. 7 and 10 being taken upon the respective lines 7—7 of Fig. 2 and 10—10 of Fig. 1, looking in the directions of the respective arrows; Fig. 11 is a section taken upon the line 11—11 of Fig. 13, looking in the directions of the arrows, showing a pair of modified sleeve rings; Fig. 12 is an elevation similar to Fig. 1, but upon a smaller scale, of a modification; Fig. 13 is a front elevation of the lower ring shown in Fig. 11; and Fig. 14 is an exploded perspective, partly in section, of one of the pistons.

The invention is illustrated as embodied in a rotary engine having a casing comprising two similar casing covers each constituted of a circularly cylindrical side wall, open at its inner end and closed at its outer end. The circularly cylindrical side wall of one of the casing covers is shown at 4, closed at its outer end by a wall 2. The circularly cylindrical side wall of the other casing cover is shown at 1, closed at its outer end by a wall 3. The end wall 2 of the said one cylinder is provided with an inwardly projecting eccentrically disposed circularly cylindrical or annular outer side-wall flange 17, of greater diameter than the radius of the cylindrical side wall 4. The end wall 3 of the other cylinder is similarly provided with a similar inwardly projecting eccentrically disposed circularly cylindrical or annular outer side-wall flange 16. The flanges 16 and 17 are reinforced by external radially disposed ribs or webs 61.

To assemble the casing covers, they are positioned with their open ends opposed, and with the peripheral rims of the cylindrical side walls 4 and 7 so juxtaposed that the flanges 16 and 17 shall be horizontally alined coaxially. A seal gasket 23 is then interposed between the juxtaposed peripheries of the cylindrical side walls 4 and 7, and the casing covers are secured together by means of a peripherally disposed circular row of bolts 24.

The casing thus formed becomes provided with a chamber 1 having an eccentrically disposed cylindrical portion formed by the alined annular flanges 16 and 17 of greater width than the rest of the chamber.

An inner annular flange 5 extends into the chamber 1 from the end wall 2 concentrically with the flange 17 to provide between the pair of flanges 5 and 17 an eccentrically disposed annular channel 6. A similar inner annular flange 8 extends similarly into the chamber 1 concentrically with the flange 16 to provide between the pair of flanges 8 and 16 an eccentrically disposed annular channel 9. The flanges 5 and 8 are naturally of smaller diameter than the diameter of the flanges 16 and 17. As the annular flange 17 is disposed opposite to and alined with the annular flange 16, and the annular flange 5 is disposed opposite to and alined with the annular flange 8, the eccentrically disposed annular channels 6 and 9 are therefore also oppositely disposed and alined.

Though the concentrically disposed flanges 5 and 17 are shown integral with the end wall 2, and the concentrically disposed flanges 8 and 16 are shown integral with the end wall 3, it will be understood that the invention is not restricted to the integral construction. The flanges 5, 8, 16 and 17 may, for example, be made in the form of separate rings bolted or otherwise secured in place between substantially planar end walls 2 and 3. The term "flange" will therefore be employed in the specification and the claims in this generic sense.

A disc 11 is disposed concentrically between the casing covers to rotate in the chamber 1 between the end walls 2 and 3 with its periphery disposed, with a floating fit, adjacent to the peripheries of the circularly cylindrical side walls 4 and 7 of the chamber 1, and with its faces disposed adjacent to and between the respective pairs of annular flanges 17, 5 and 16, 8. A shaft 10 is secured to the disc 11, as by means of a key 12, so as to rotate with the disc 11. The shaft 10 is enlarged where it is secured to the disc 11 in order to increase its torsional strength, where such increase is most needed. The shaft 10 is shown journaled in bearings 15 disposed in the respective end walls 2 and 3, and is lubricated by oil valves 57. The bearings 15 are shown in Fig. 2 held in place by annular shoulders of the end walls 2 and 3 engaging their respective outer ends and by springs 20 coiled about the shaft 10 thrusting against their respective inner ends. The spring 20 is omitted from Fig. 3 for clearness. The inner end of each coil spring 20 engages a washer 21 to force a packing seal 22 in place. The outer ends of the coil springs 20 engage the enlarged portion of the shaft 10.

A pair of intermeshing sleeve rings 25 and 26 of the same diameter are rotatably disposed in each of the channels 6 and 9, one pair in bearing contact with the annular flange 17 of the channel 6 and the other pair in bearing contact with the annular flange 16 of the channel 9. A similar pair of intermeshing sleeve rings 27 and 28 are also rotatably disposed in each of the channels 6 and 9, one pair in bearing contact with the annular flange 5 of the channel 6, and the other pair in bearing contact with the annular flange 8 of the channel 9. One of the rings of each pair is of greater mass than the other, for a reason that will presently appear.

Pistons 14 are disposed in each of the channels 6 and 9. The number of pistons 14 in each channel is preferably even, and they are preferably so mounted that the center of gravity of all the pistons shall remain fixed. This enables the pistons to operate in pairs, dynamically balanced. The pistons are illustrated as four in number, to constitute two pairs.

Each piston 14 is provided with an outer arcuate wall 58, conforming in shape and disposed adjacent to the pair of rings 25 and 26, and an inner arcuate wall 59 conforming in shape and disposed adjacent to the pair of rings 27 and 28. Each piston 14 is provided also with outer and inner flat walls connecting the arcuate walls 58 and 59, and with end walls 60. The outer flat wall of each piston 14 is disposed adjacent and conforms in shape to the end wall 2 or 3, as the case may be, and the inner flat wall of each piston 14 is disposed adjacent and conforms in shape to the corresponding face of the disc 11.

By reason of their conforming arcuate shape, the pistons 14 are rendered freely movable in their respective channels 6 and 9 to provide between them inlet working chambers into which a fluid medium may be supplied to the channels from an inlet 33 when the pistons 14 occupy predetermined positions in their respective channels, to the right, as viewed in Fig. 3, and outlet working chambers through which the fluid medium may be exhausted from the channels to an outlet 34 when the pistons 14 occupy other predetermined positions in their respective channels, to the left, as viewed in Fig. 3. Two inlet working chambers are shown between the uppermost, the lowermost and the right-hand three pistons of Fig. 3, and two outlet working chambers are shown in the same Fig. 3 between the said uppermost and lowermost pistons and the left-hand three pistons. These inlet and outlet working chambers are continually varying in size and position, as hereinafter more fully explained. The inlet working chamber between the lowermost and the right-hand piston of Fig. 3 is smaller than that between the right-hand and the uppermost pistons of the same Fig. 3.

The disc 11 is provided on each of its faces with diametrical symmetrically disposed guide slots 18, equal in number and respectively associated with or corresponding to the pairs of pistons 14. As two pairs of pistons 14 are illustrated, two such slots 18 are shown on each face of the disc 11, at right angles to each other. The slots 18 on each face of the disc 11 are disposed opposite to, so as to be alined with, the corresponding slots 18 on the other face of the disc 11.

The pistons 14 of each pair are confined to move in their respective channels along the slot 18 with which they are associated, one on each side of the center of the disc 11. To this end, each piston 14 is provided with a guide shoe 13 that extends into the corresponding guide slot 18 to slide therein. The shoes 13 are mounted on pivot pinions 19 that are freely turnable in correspondingly shaped bores of the pistons 14. They are preferably of the same diameter as the width of the pistons 14, in order to reduce wear.

By means of this loose connection between the pistons 14 and the disc 11, the movement of the pistons 14 becomes communicated to the disc 11 when the pistons 14 are actuated in their respective channels 6 and 9 by steam, for example, in order to effect rotation of the shaft 10, as before described; or, if the shaft 10 is driven from an outside power source, to rotate the disc 11, the rotative movement of the disc 11 becomes communicated to the pistons 14, in order to enable the pistons to effect, for example, pumping or compressing action. Throughout the operation, however, the loose connection maintains the pistons 14 of each pair always dynamically balanced with respect to the disc 11, on opposite sides of its center.

When the apparatus is operated as a rotary engine, for example, the steam is admitted through the inlet 33 into a compartment space 36 between a manifold 31 and the outer wall 2 of the casing to which the manifold 31 is secured by bolts 32 with a sealing gasket 56 interposed. The steam will travel from the compartment space 36, by way of through port-hole openings 37 in the end wall 2, into the before-described inlet chambers of the channel 6. Four through port-hole openings 37 are shown, two corresponding to each of the two inlet chambers before mentioned, in order that there may be at least one port-hole opening 37 open to each inlet chamber, even though the other port-hole opening 37 may happen to be covered by one of the pistons 14.

Considering the inlet working chamber between the lowermost and the right-hand pistons 14 of Fig. 3, for example, the force of the expansive action of the steam thereon upon the end walls 60 of these two pistons will tend to drive the right-hand piston 14 upward in the channel 6, and the lower-most piston 14, in the same channel 6, to the left. The forces thus exerted upon these two pistons 14 will be communicated to their respective shoes 13 and, from these shoes 13, to the walls of the slots 18 in which they are slidably mounted. The right-hand piston 14 of Fig. 3, therefore, will exert a force tending to turn the disc 11 counter-clockwise. The lowermost piston 14 of the same Fig. 3, on the other hand, will exert a force tending to turn the disc 11 clockwise. Though the forces exerted by the steam on the adjacently disposed faces 60 of these two pistons 14, in the said inlet chamber, are equal, the leverage of the right-hand piston 14, owing to the eccentric arrangement of the channel 6 with respect to the disc 11, is considerably greater than that of the lowermost piston 14. This will cause the inlet chamber between the lowermost and the right-hand pistons 14 of Fig. 3 to gradually increase in size, as the lowermost and the right-hand pistons travel in the channel, until the right-hand piston 14 assumes the position of the uppermost piston and the lowermost piston assumes the position of the right-hand piston. Thereafter, as the uppermost piston 14 travels toward the position of the left-hand piston 14, and the right-hand piston 14 toward the position of the uppermost piston 14, the chamber between them changes from an inlet working chamber into an outlet working chamber. By the time that the inlet working chamber becomes converted into an outlet working chamber, the steam therein has spent its force of expansion, and exhausts from the outlet working chamber through the outlet 34. The outlet working chamber then grows gradually smaller, as the pistons continue their travel until, as the pistons assume a position at the right of Fig. 3, the outlet working chambers become inlet working chambers once more. The net result of the forces exerted upon the end walls 60 of these two pistons 14 by the steam, therefore, will be to cause the disc 11 to turn counter-clockwise, thus effecting counter-clockwise rotation also of the shaft 10 to which the disc 11 is secured. This is the operation of the apparatus for the production of power.

Where the apparatus is used as a pump or a compressor, on the other hand, instead of as an engine, the movement of the pistons 14 resulting from rotation of the disc 11 by rotating the shaft 10 from an external source of power will effect the transport of water or other fluid or air or other gas from the inlet spaces in the channels 6 and 9 to the outlet spaces.

The description has proceeded on the supposition that there is only one inlet chamber on the right-hand side of Fig. 3. In reality, however, there are two such inlet chambers. The turning force exerted by the expanding steam in the inlet chamber between the lowermost and the right-hand pistons 14 of Fig. 3 will be augmented by the force of expansion similarly exerted by the steam in the inlet chamber between the right-hand and the uppermost pistons 14 shown in Fig. 3, since the leverage of the uppermost piston is greater than that of the right-hand piston.

This action of the expanding steam in the two inlet chambers of the channel 6 shown at the right of Fig. 3 is further augmented by precisely identical action in the corresponding inlet chambers between the pistons 14 in the channel 9. The steam in the compartment space 36 under the manifold 31 is admitted, through a perforation 38 in the alined flanges 16 and 17 of the respective end walls 2 and 3, into a corresponding compartment space 40, Fig. 2, between a similarly arranged manifold 30 and the end wall 3. The end wall 3 is provided with through port-hole openings 41, corresponding to the through port-hole openings 37 of the end wall 2.

The operation of the pistons 14 in the channel 6, therefore, is balanced dynamically, not only by reason of the fact that they operate in pairs, but also because the forces exerted by the pairs of pistons 14 in the channel 6, on one side face of the disc 11, are accompanied by equal forces exerted by the pairs of pistons 14 in the channel 9, on the other side face of the disc 11. Whatever changes are taking place in the channel 6, on one side face of the disc 11, therefore, are taking place also in the channel 9 on its other side face. The pressures on the opposite side faces of the disc 11 become thus equalized. Since no excessive unbalanced pressures, therefore, can be developed by the fluid in the chambers, there will result a minimum of rubbing between the moving parts. The device is therefore substantially free of frictional forces that might otherwise arise from this source.

The exhaust from the outlet chambers of the channel 6 takes place by way of through port-hole openings 44 of the end wall 2, Fig. 1, into a compartment space 39 under the manifold 31 connected with the exhaust outlet 34. The exhaust from the corresponding outlet chambers of the channel 9 takes place by way of through port-hole openings 42 of the end wall 3, Fig. 3, into a compartment space 65 under the manifold 30, by way of a through perforation 43 in the alined flanges 16 and 17 of the end walls 3 and 2, similar to the through perforation 38, into the compartment space 39 under the manifold 31, and to the exhaust outlet 34.

The manifold 30 is shown in Fig. 2 without inlet 33 or outlet 34. If desired, however, as illustrated in Fig. 12, the manifolds 30 and 31 may be of identical construction, with only the one inlet 33 which, in the case of the manifold 30, may serve as the outlet. The steam would then be admitted from the inlet 33, into the manifold compartment space 36, through the through port-hole openings 37, into the inlet chambers in the channel 6, as before described; and also by way of the through perforation 38, into the manifold compartment space 40, through the port-hole openings 41, into the corresponding inlet chambers in the channel 9, also as before described. The steam would be exhausted from the outlet chambers in the channel 6, however, through the through port-hole openings 44, into the manifold-compartment space 39, then by way of the through perforation 43, into the manifold-compartment space 65 and the outlet 34; and also from the outlet spaces in the channel 9, through the port-hole openings 42, into the manifold-compartment space 65 and the outlet 34.

The manifold 31 is shown in Fig. 1 provided not only with the compartment space 36, connected with the inlet 33, and the compartment space 39, connected with the outlet 34, but also with a neutral compartment space 45 between them. The manifold 30 is similarly shown provided with a neutral compartment space 46, Fig. 2, between the compartment spaces 40 and 65. The neutral compartment spaces 45 and 46 respectively communicate with port-hole openings 47 and 48 in the respective end walls 2 and 3. The port-hole openings 47 and 48 communicate directly with the lowermost portions of the respective channels 6 and 9, at the point where the exhaust chambers between the successive pistons 14, to the left of the lowermost piston 14 shown in Fig. 3, are about to become inlet chambers, to the right thereof, where they are about to receive a fresh intake supply of live steam. The presence of the neutral compartments 45 and 46 under the respective manifolds 31 and 30, separating the intake side from the exhaust side, reduces the possibility of the steam or other fluid escaping directly from one of these sides to the other within the engine. Such escape can occur only indirectly through the neutral compartments. The neutral compartments 45 and 46 may be bled, from time to time, by waste cocks 35.

One of the objects of the invention, as before stated, is to prevent leakage. This is effected by rendering the working chambers tight, but without impairing the efficiency through the introduction of undue frictional forces. To this end, the sleeve rings of each pair of intermeshing rings 25, 26 and 27, 28 are rendered expandable or spreadable laterally. This result may be attained in any desired way, as by means of coil springs 29 in recesses 49 in one of the rings of each pair engaging the other ring of each pair.

The use of the springs 29 is not, however, essential. The rings must rotate in their channels 6 and 9 as a necessary consequence of the fact that their curved surfaces are engaged by the arcuate faces of the traveling pistons 14 and their flat end faces are engaged by the respective faces of the rotating disc 11. As the rings of each pair, moreover, as before stated, are of different mass, they will tend to rotate at different speeds. This tendency will be enhanced because of the pressure developed by the fluids. If, therefore, the intermeshing of the rings of each pair is effected by means of teeth with angularly arranged walls, as shown in Figs. 2 and 6 to 8, the spreading or expansible action laterally will be effected, during the operation, even without the aid of the springs 29. The use of the springs 29 may be desirable, however, where the intermeshing teeth of the rings 72 and 73 are not provided with angular walls, as shown in Figs. 11 and 13, and particularly at the commencement of the operation.

The pistons 14 are shown of greater length between their end walls 60 than the distance between several teeth of the rings, in order to prevent the introduction of any additional source of leakage as the rings of each pair spread or expand.

Further to prevent leakage, each piston 14 is provided with a transversely disposed groove in each of its arcuate walls. Right-angularly shaped leakage-preventing blades 50 are overlappingly disposed in these grooves, forced yieldingly outward by springs 51 and 52 or 70. The blades 50, therefore, will be maintained by the springs 51 and 52 or 70 in snug engagement with the rings 25, 26, 27 and 28 or 72 and 73, with the end walls 2 and 3, respectively, and with the disc 11. A continuous-contact sliding fit between the blades 50 and the channel walls is thus always assured, and without undue friction. In cooperation with the spread-apart rings 25, 26, 27 and 28 or 72 and 73, this provides for tight working chambers.

Means additional to the face clearance between the various parts is thus provided for preventing leakage of the fluid medium between: first, the outer arcuate piston wall 58 and the outer annular flange 17 or 16, as the case may be; secondly, the inner arcuate piston wall 59 and the inner annular flange 5 or 8, as the case may be; thirdly, the outer flat connecting piston wall and the end wall 2 or 3, as the case may be; and fourthly, the inner flat connecting piston wall and the right-hand side or the left-hand side, as the case may be, of the disc 11.

The lower portion of the chamber 1 contains lubricating oil, which may be reached by means of screw plugs 53 and 54. The screw plug 54 is disposed at the lowermost portion of the chamber 1. The screw plug 53 closes an opening 55, Figs. 3 and 10, that communicates with the chamber 1. The lubricating oil and waste may therefore be drained by opening the screw plug 54, and replenished by means of the screw plug 53. The oil may be prevented from leaking out of the chamber 1 by providing the peripheral rim of one of the casing covers with a series of gripping threads, as shown, for biting into the gasket 23. Not only is a seal thus assured for the fluids in the chamber 1, moreover, but also the exact desired spacing between the casing covers may thereby be determined, in order to provide the desired clearance for the moving parts.

The lubricating oil at the bottom of the chamber 1 is whirled about by reason of the fact that the bottom of the rotating disc 11 is disposed therein during its rotation. This whirling results in completely lubricating all the parts within the engine, notwithstanding that the working chambers remain leak-tight. The effectiveness of the seal between the disc 11 and the rings, moreover, becomes thus increased.

Further to aid the lubrication, the pinions 19 are each provided with a centrally disposed oil hole 66, opening into an oil groove 68 in the shoe 13, and the rings 25, 26, 27, 28, 72 and 73, are each provided with oil grooves 69.

Further modifications will occur to persons skilled in the art, and all such are considered to fall within the spirit and scope of the present invention, as defined in the appended claims.

What is claimed is:

1. Apparatus of the character described, having, in combination, a casing having a chamber provided with a circularly cylindrical side wall and an end wall from which a pair of outer and inner concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pistons in the channel each having outer and inner arcuate piston walls conforming in shape and disposed adjacent to the respective annular flanges and outer and inner walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, means loosely connecting the pistons with the disc in order that movement of the pistons may be communicated to the disc or movement of the disc may be communicated to the pistons, means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet, and means additional to space clearance between the parts for preventing leakage of the fluid medium between the outer arcuate piston wall and the outer annular flange, the inner arcuate piston wall and the inner annular flange, the outer connecting piston wall and the said end wall, and the inner connecting piston wall and the said face of the disc.

2. Apparatus of the character described, having, in combination, a casing having a chamber provided with a circularly cylindrical side wall and an end wall from which a pair of outer and inner concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pistons in the channel each having outer and inner arcuate piston walls conforming in shape and disposed adjacent to the respective annular flanges and outer and inner walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, means loosely connecting the pistons with the disc in order that movement of the pistons may be communicated to the disc or movement of the disc may be communicated to the pistons, means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet, the pistons being provided with leakage-preventing members along their walls, and means additional to the space clearance between the parts for maintaining the leakage-preventing members in engagement with the annular flanges, the said end wall and the said face of the disc to prevent leakage of the fluid medium between the outer arcuate piston wall and the outer annular flange, the inner arcuate piston wall and the inner annular flange, the outer connecting piston wall and the said end wall, and the inner connecting piston wall and the said face of the disc.

3. Apparatus of the character described, having, in combination, a casing having a chamber provided with a circularly cylindrical side wall and an end wall from which a pair of concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pairs of pistons in the channel, each piston having two arcuate walls conforming in shape and disposed adjacent to the respective annular flanges and two walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, means loosely connecting the pistons with the disc in order that movement of the pistons may be communicated to the disc or movement of the disc may be communicated to the pistons, the loose-connecting means maintaining the pistons always balanced dynamically with respect to the disc, and means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet.

4. Apparatus of the character described, having, in combination, a casing having a chamber provided with a circularly cylindrical side wall and an end wall from which a pair of concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pairs of pistons in the channel, each piston having two arcuate walls conforming in shape and disposed adjacent to the respective annular flanges and two walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, means loosely connecting the pistons with the disc and confining the movement of the pistons of each pair symmetrically in order that movement of the pistons may be communicated to the disc or movement of the disc may be communicated to the pistons while maintaining the pistons always balanced dynamically with respect to the disc, and means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet.

5. Apparatus of the character described, having, in combination, a casing having a chamber provided with a circularly cylindrical side wall and an end wall from which a pair of concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, the disc being provided with a plurality of symmetrically disposed guiding means disposed radially of the disc on both sides of its center, a plurality of pairs of pistons equal in number to the number of guiding means in the channel, each piston having two arcuate walls conforming in shape and disposed adjacent to the respective annular flanges and two walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, the pistons of each pair being guided in their movement by one of the guiding means, one on each side of the center of the disc, in order that movement of the pistons may be communicated to the disc or movement of the disc may be communicated to the pistons, and whereby the pistons are always balanced dynamically with respect to the disc, and means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet.

6. Apparatus of the character described, having, in combination, a casing having a chamber provided with a circularly cylindrical side wall and an end wall from which a pair of concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, the disc being provided with a plurality of symmetrically disposed diametral guiding slots, a plurality of pairs of pistons equal in number to the number of slots, each piston having two arcuate walls conforming in shape and disposed adjacent to the respective annular flanges and two walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, the pistons of each pair being slidably mounted in one of the guiding slots, one on each side of the center of the disc, in order that movement of the pistons may be communicated to the disc or movement of the disc may be communicated to the pistons, and whereby the pistons are always balanced dynamically with respect to the disc, and means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet.

7. Apparatus of the character described, having, in combination, a casing having a chamber provided with a circularly cylindrical side wall and an end wall from which a pair of outer and inner concentric annular flanges extend into the chamber eccentrically to the cylindrical wall to provide between the flanges an eccentrically disposed annular channel, two pairs of rings free to rotate in the channel, one pair in bearing contact with each flange of the channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pistons in the channel between the pairs of rings, each piston having two arcuate piston walls conforming in shape and disposed adjacent to the respective pairs of rings and outer and inner walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, means loosely connecting the pistons with the disc in order that movement of the pistons may be communicated to the disc or movement of the disc may be communicated to the pistons, means for supplying the fluid medium through the inlet into the inlet chamber and for exhausting the fluid medium from the outlet chamber to the outlet to effect relative movement of the pistons in the channel and consequent rotation of the disc and the shaft or for rotation the shaft and the disc to transport the fluid medium from the inlet chamber, after it has been supplied thereto from the inlet, to the outlet chamber for exhaust through the outlet, and the rings being expansible with respect to each other into contact with the said face of the disc and the said end wall to prevent leakage of the fluid medium between the channel and the disc, respectively.

8. Apparatus of the character described, having, in combination, a casing having a chamber provided with a circularly cylindrical side wall and an end wall from which a pair of outer and inner concentric annular flanges extend into the chamber eccentrically to the cylindrical wall to provide between the flanges an eccentrically disposed annular channel, the said end wall having openings extending from the exterior of the casing into the channel, a manifold disposed exteriorly of the casing having a first compartment space communicating with one of the openings and provided with an inlet through which a fluid medium may be supplied to the first compartment space and, through the said one opening, to the channel, the manifold having a second compartment space communicating with another of the openings and provided with an outlet through which the fluid medium in the second compartment space may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pistons in the channel each having outer and inner arcuate piston walls conforming in shape and disposed adjacent to the respective annular flanges and two outer and inner walls connecting the arcuate walls disposed adjacent and conforming in shape to the said end wall and the said face of the disc, respectively, the pistons being freely movable in the channel to provide between them an inlet chamber into which the fluid medium may be supplied from the inlet into the first compartment space and through the said one opening when the pistons occupy predetermined positions in the channel and an outlet chamber from which the fluid medium may be exhausted through the said other opening and the second compartment space to the outlet when the pistons occupy other predetermined positions in the channel, means loosely connecting the pistons with the disc in order that movement of the pistons may be communicated to the disc or movement of the disc may be communicated to the pistons, means for supplying the fluid medium through the inlet to the first compartment space and, through the said one opening, into the inlet chamber and for exhausting the fluid medium from the outlet chamber through the said other opening and the second compartment space to the outlet to effect relative movement of the pistons in the channel and consequent rotation of the disc and the shaft or for rotating the shaft and the disc to transport the fluid medium from the inlet chamber, after it has been supplied thereto through the inlet to the first compartment space, to the outlet chamber for exhaust through the second compartment space and the outlet, and means additional to space clearance between the parts for preventing leakage of the fluid medium between the outer arcuate piston wall and the outer annular flange, the inner arcuate piston wall and the inner annular flange, the outer connecting piston wall and the said end wall, and the inner connecting piston wall and the said face of the disc.

9. Apparatus of the character described, having, in combination, a casing having a chamber provided with a circularly cylindrical side wall and an end wall from which a pair of concentric annular flanges extend into the chamber eccentrically to the cylindrical wall to provide between the flanges an eccentrically disposed annular channel, the casing being provided with an inlet through which a fluid medium may be supplied to the channel and an outlet through which the fluid medium may be exhausted from the channel, a disc disposed opposite to the said end wall to rotate in the chamber with its periphery disposed adjacent to the cylindrical wall and one of its faces disposed adjacent to the pair of annular flanges, a shaft rotatable with the disc, a plurality of pistons in the channel each having two arcuate walls conforming in shape and disposed adjacent to the respective annular flanges and two walls connecting the arcuate walls disposed adjacent and conforming in shape to the said end wall and the said face of the disc, respectively, the pistons being freely movable in the channel to provide between them an inlet chamber into which the fluid medium may be supplied through the inlet when the pistons occupy predetermined positions in the channel and an outlet chamber through which the fluid medium may be exhausted to the outlet when the pistons occupy other predetermined positions in the channel, the channel being provided with a chamber between the predetermined positions neutral with respect to the inlet and outlet chambers, means loosely connecting the pistons with the disc in order that movement of the pistons may be communicated to the disc or movement of the disc may be communicated to the pistons, and means for supplying the fluid medium through the inlet into the inlet chamber and for exhausting the fluid medium from the outlet chamber to the outlet to effect relative movement of the pistons in the channel and consequent rotation of the disc and the shaft or for rotating the shaft and the disc to transport the fluid medium from the inlet chamber, after it has been supplied thereto from the inlet, to the outlet chamber for exhaust through the outlet.

10. Apparatus of the character described, having, in combination, a casing having a chamber provided with a circularly cylindrical side wall and end walls from each of which a pair of outer and inner concentric annular flanges extend into the chamber eccentrically to the cylindrical wall to provide between the flanges an eccentrically disposed annular channel, the annular flanges of one pair being disposed opposite to the annular flanges of the other pair, the casing being provided with an inlet through which a fluid medium may be supplied to the channels and an outlet through which the fluid medium may be exhausted from the channels, a disc disposed between the said end walls to rotate in the chamber with its periphery disposed adjacent to the cylindrical wall and its faces disposed adjacent to the respective pairs of annular flanges, a shaft rotatable with the disc, a plurality of pistons in each channel each having outer and inner arcuate piston walls conforming in shape and disposed adjacent to the respective annular flanges of the corresponding channel and outer and inner walls connecting the arcuate walls disposed adjacent and conforming in shape to the corresponding end wall of the said end walls and the corresponding face of the disc, respectively, the pistons in each channel being freely movable therein to provide between them an inlet chamber into which the fluid medium may be supplied through the inlet when the pistons occupy predetermined positions in the respective channels and an outlet chamber through which the fluid medium may be exhausted to the outlet when the pistons occupy other predetermined positions in the respective channels, means loosely connecting the pistons with the disc in order that movement of the pistons may be communicated to the disc or movement of the disc may be communicated to the pistons, means for supplying the fluid medium through the inlet into the inlet chambers and for exhausting the fluid medium from the outlet chambers to the outlet to effect relative movement of the pistons in the respective channels and consequent rotation of the disc and the shaft or for rotating the shaft and the disc to transport the fluid medium from the inlet chambers, after it has been supplied thereto from the inlet, to the outlet chambers for exhaust through the outlet, and means additional to space clearance between the parts for preventing leakage of the fluid medium between the outer arcuate piston walls and the respective outer annular flanges, the inner arcuate piston walls and the respective inner annular flanges, the outer connecting piston walls, and the respective said end walls, and the inner connecting piston walls and the respective faces of the disc.

11. Apparatus of the character described, having, in combination, a casing having a chamber provided with a circularly cylindrical side wall and end walls from each of which a pair of concentric annular flanges extend into the chamber eccentrically to the cylindrical wall to provide between the flanges an eccentrically disposed annular channel, the annular flanges of one pair being disposed opposite to the annular flanges of the other pair, the casing being provided with an inlet through which a fluid medium may be supplied to the channels and an outlet through which the fluid medium may be exhausted from the channels, a disc disposed between the said end walls to rotate in the chamber with its periphery disposed adjacent to the cylindrical wall and its faces disposed adjacent to the respective pairs of annular flanges, a shaft rotatable with the disc, a plurality of pairs of pistons in each channel, each piston having two arcuate walls conforming in shape and disposed adjacent to the respective annular flanges of the corresponding channel and two walls connecting the arcuate walls disposed adjacent and conforming in shape to the corresponding end wall of the said end walls and the corresponding face of the disc, respectively, the pistons in each channel being freely movable therein to provide between them an inlet chamber into which the fluid medium may be supplied through the inlet when the pistons occupy predetermined positions in the respective channels and an outlet chamber through which the fluid medium may be exhausted to the outlet when the pistons occupy other predetermined positions in the respective channels, means loosely connecting the pistons with the disc in order that movement of the pistons may be communicated to the disc or movement of the disc may be communicated to the pistons, the loose-connecting means maintaining the pistons always balanced dynamically with respect to the disc, and means for supplying the fluid medium through the inlet into the inlet chambers and for exhausting the fluid medium from the outlet chambers to the outlet to effect relative movement of the pistons in the respective channels and consequent rotation of the disc and the shaft or for rotating the shaft and the disc to transport the fluid medium from the inlet chambers, after it has been supplied thereto from the inlet, to the outlet chambers for exhaust through the outlet.

12. Apparatus of the character described, having, in combination, a casing having a chamber provided with a circularly cylindrical side wall and end walls from each of which a pair of concentric annular flanges extend into the chamber eccentrically to the cylindrical wall to provide between the flanges an eccentrically disposed annular channel, the annular flanges of one pair being disposed opposite to the annular flanges of the other pair, the casing being provided with an inlet through which a fluid medium may be supplied to the channels and an outlet through which the fluid medium may be exhausted from the channels, a disc disposed between the said end walls to rotate in the chamber with its periphery disposed adjacent to the cylindrical wall and its faces disposed adjacent to the respective pairs of annular flanges, a shaft rotatable with the disc, a plurality of pairs of pistons in each channel, each piston having two arcuate walls conforming in shape and disposed adjacent to the respective annular flanges of the corresponding channel and two walls connecting the arcuate walls disposed adjacent and conforming in shape to the corresponding end wall of the said end walls and the corresponding face of the disc, respectively, the pistons in each channel being freely movable therein to provide between them an inlet chamber into which the fluid medium may be supplied through the inlet when the pistons occupy predetermined positions in the respective channels and an outlet chamber through which the fluid medium may be exhausted to the outlet when the pistons occupy other predetermined positions in the respective channels, means loosely connecting the pistons with the disc and confining the movement of the pistons of each pair symmetrically in order that movement of the pistons may be communicated to the disc or movement of the disc may be communicated to the pistons while maintaining the pistons always balanced dynamically with respect to the disc, and means for supplying the fluid medium through the inlet into the inlet chambers and for exhausting the fluid medium from the outlet chambers to the outlet to effect relative movement of the pistons in the respective channels and consequent rotation of the disc and the shaft or for rotating the shaft and the disc to transport the fluid medium from the inlet chambers, after it has been supplied thereto from the inlet, to the outlet chambers for exhaust through the outlet.

13. Apparatus of the character described, having, in combination, a casing having a chamber provided with a circularly cylindrical side wall and end walls from each of which a pair of concentric annular flanges extend into the chamber eccentrically to the cylindrical wall to provide between the flanges an eccentrically disposed annular channel, the annular flanges of one pair being disposed opposite to the annular flanges of the other pair, the casing being provided with an inlet through which a fluid medium may be supplied to the channels and an outlet through which the fluid medium may be exhausted from the channels, a disc disposed between the said end walls to rotate in the chamber with its periphery disposed adjacent to the cylindrical wall and its faces disposed adjacent to the respective pairs of annular flanges, a shaft rotatable with the disc, the disc being provided on its faces with a plurality of symmetrically disposed guiding means disposed radially of the disc on both sides of its center, a plurality of pairs of pistons equal in number to the number of guiding means in each channel, each piston having two arcuate walls conforming in shape and disposed adjacent to the respective annular flanges of the corresponding channel and two walls connecting the arcuate walls disposed adjacent and conforming in shape to the corresponding end wall of the said end walls and the corresponding face of the disc, respectively, the pistons in each channel being freely movable therein to provide between them an inlet chamber into which the fluid medium may be supplied through the inlet when the pistons occupy predetermined positions in the respective channels and an outlet chamber through which the fluid medium may be exhausted to the outlet when the pistons occupy other predetermined positions in the respective channels, the pistons of each pair being guided in their movement by one of the guiding means, one on each side of the center of the disc, in order that movement of the pistons may be communicated to the disc or movement of the disc may be communicated to the pistons, and whereby the pistons are always balanced dynamically with respect to the disc, and means for supplying the fluid medium through the inlet into the inlet chambers and for exhausting the fluid medium from the outlet chambers to the outlet to effect relative movement of the pistons in the respective channels and consequent rotation of the disc and the shaft or for rotating the shaft and the disc to transport the fluid medium from the inlet chambers, after it has been supplied thereto from the inlet, to the outlet chambers for exhaust through the outlet.

14. Apparatus of the character described, having, in combination, an oil-tight casing comprising two similar casing covers each having a circularly cylindrical side wall and an end wall from which projects an eccentrically disposed annular flange terminating in an end-wall portion, the casing covers being assembled with the circularly cylindrical side walls alined and with the annular flanges alined to form a chamber provided with a circularly cylindrical side wall and end walls with an enlarged portion of the chamber eccentrically disposed between the flanges and the end-wall portions, each casing cover having an annular flange concentric with its eccentrically disposed annular flange extending into the enlarged portion of the chamber to form an eccentrically disposed annular channel between the annular flanges of each casing cover, the annular channels being alined, two pairs of rings free to rotate in each channel, one pair in bearing contact with each flange of the corresponding channel, the casing being provided with an inlet through which a fluid medium may be supplied to the channels and an outlet through which the fluid medium may be exhausted from the channels, a disc disposed between the said end walls to rotate in the chamber in the oil contained therein with its periphery disposed adjacent to the cylindrical wall and its faces disposed adjacent to the annular flanges of the respective casing covers, the said end walls being provided with oil-tight bearings, a shaft rotatable with the disc journaled in the bearings, the disc being provided on its faces with a plurality of symmetrically disposed diametral guiding slots, a plurality of pairs of pistons equal in number to the number of slots in each channel, each piston having two arcuate walls conforming in shape and disposed adjacent to the respective pairs of rings and two walls connecting the arcuate walls disposed adjacent and conforming in shape to the corresponding end wall of the said end walls and the corresponding face of the disc, respectively, the pistons in each channel being freely movable therein to provide between them an inlet chamber into which the fluid medium may be supplied through the inlet when the pistons occupy predetermined positions in the respective channels and an outlet chamber through which the fluid medium may be exhausted to the outlet when the pistons occupy other predetermined positions in the respective channels, each piston having a pinion provided with a shoe, the shoes of each pair of pistons being slidably mounted in the corresponding guiding slot, one on each side of the center of the disc, to connect the pistons loosely with the disc and to confine the movement of the pistons of each pair symmetrically in order that movement of the pistons may be communicated to the disc or movement of the disc may be communicated to the pistons while maintaining the pistons always balanced with respect to the disc, and means for supplying the fluid medium through the inlet into the inlet chambers and for exhausting the fluid medium from the outlet chambers to the outlet to effect relative movement of the pistons in the respective channels and consequent rotation of the disc and the shaft or for rotating the shaft and the disc to transport the fluid medium from the inlet chambers, after it has been supplied thereto from the inlet, to the outlet chambers for exhaust from the outlet, the rings of each pair of rings being expansible with respect to each other into contact with the respective end walls of the said end walls and the respective faces of the disc, respectively, to prevent leakage of the fluid between the channels and the disc.

15. Apparatus of the character described, having, in combination, a casing provided with an inlet through which a fluid medium may be supplied to the casing and an outlet through which the fluid medium may be exhausted from the casing, a disc rotatable in the casing having a face disposed opposite to a wall of the casing, a shaft rotatable with the disc, the disc being provided with a plurality of symmetrically disposed diametral guiding slots, a plurality of pairs of pistons equal in number to the number of slots, each piston having two walls disposed adjacent and conforming in shape to the said wall of the casing and the said face of the disc, respectively, means confining the pistons to move freely in the casing along an arc eccentric to the shaft to provide between the pistons an inlet chamber into which the fluid medium may be supplied through the inlet when the pistons occupy predetermined positions in the casing and an outlet chamber through which the fluid medium may be exhausted to the outlet when the pistons occupy other predetermined positions in the casing, the pistons of each pair being slidably mounted in one of the guiding slots, one on each side of the center of the disc, in order that movement of the pistons may be communicated to the disc or movement of the disc may be communicated to the pistons, and whereby the pistons are always balanced dynamically with respect to the disc, and means for supplying the fluid medium through the inlet into the inlet chamber and for exhausting the fluid medium from the outlet chamber to the outlet to effect relative movement of the pistons in the casing and consequent rotation of the disc and the shaft or for rotating the shaft and the disc to transport the fluid medium from the inlet chamber, after it has been supplied thereto from the inlet, to the outlet chamber for exhaust through the outlet.

BIAGIO A. CARIDEO.

REFERENCES CITED

The following references are of record in the file of this patent:

UNITED STATES PATENTS

| Number | Name | Date |
| --- | --- | --- |
| 154,003 | Beal | Aug. 11, 1874 |
| 727,171 | Mayer | May 5, 1903 |
| 983,605 | Cole | Feb. 7, 1911 |

FOREIGN PATENTS

| Number | Country | Date |
| --- | --- | --- |
| 314,736 | Great Britain | July 4, 1929 |
| 326,109 | Great Britain | Mar. 6, 1930 |
| 500,480 | Germany | June 21, 1930 |